(12) United States Patent  
Cipressi et al.

(10) Patent No.: US 6,505,612 B1
(45) Date of Patent: Jan. 14, 2003

(54) NATURAL GAS FUEL METERING ASSEMBLY AND ENGINE WITH SAME

(75) Inventors: Thomas Samuel Cipressi, Cedar Falls, IA (US); Rodney Allen Schindler, Hudson, IA (US); William Lyle Hartman, Waterloo, IA (US); John Philip Latusek, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/024,435

(22) Filed: Dec. 20, 2001

(51) Int. Cl.[7] .................................................. F02B 43/00
(52) U.S. Cl. ........................................................ 123/527
(58) Field of Search .............................. 123/527, 27 GE

(56) References Cited

PUBLICATIONS

John Deere Drawing RE502852, 5 pages, version RG 40, Jan. 29, 2001.

*Primary Examiner*—Noah P. Kamen

(57) ABSTRACT

A fuel metering assembly for a natural gas fuel engine having an engine block from a diesel engine with a diesel engine injector pump flange integrally cast as part of the engine block. The metering assembly has inlet and outlet manifolds for fuel and a plurality of fuel injectors therebetween. The manifolds are held in a fixed position relative to one another by a plate on one end that fits to the injector pump flange on the engine block to mount the metering assembly to the existing flange. In addition, the inlet manifold includes pressure and temperature sensors inside the inlet manifold to sense pressure and temperature at the point of metering.

9 Claims, 2 Drawing Sheets

NATURAL GAS FUEL METERING ASSEMBLY AND ENGINE WITH SAME

FIELD OF THE INVENTION

The present invention relates to a natural gas fuel metering assembly for a natural gas engine and in particular to a metering assembly that is conveniently mounted to an engine block and has temperature and pressure sensors positioned in the fuel stream immediately before the fuel injectors to provide pressure and temperature sensing of the fuel at the point of metering.

BACKGROUND AND SUMMARY OF THE INVENTION

Heavy duty natural gas engines, such as those used in school buses and urban transit buses, are typically natural gas conversions of diesel engines. The engines share many components with the diesel engine from which it is derived. One such component is the engine block. The diesel engine fuel system is replaced with a fuel system designed to deliver the gaseous fuel, i.e. natural gas, to the engine. The natural gas fuel system includes a metering assembly having a plurality of natural gas fuel injectors. The injectors are opened and closed electronically to control the quantity of fuel being delivered to the intake manifold of the engine. The injectors are disposed between a fuel inlet manifold and a fuel outlet manifold and function to control the quantity of fuel flowing from the inlet to the outlet manifold. From the outlet manifold the fuel is delivered to the combustion air intake manifold.

Upstream of the fuel metering assembly, a temperature sensor and a pressure sensor are placed in the fuel supply line. The output signals of the temperature and pressure sensors are used by the fuel control system to controls the injectors, thereby controlling the quantity of fuel delivered to the engine based on the temperature and pressure at the point of metering. In many natural gas engines, the fuel metering assembly is attached to the side of the engine block wherever space permits. In addition, the pressure and temperature sensors upstream of the metering assembly are not close enough to the injectors to provide an accurate measurement of the natural gas temperature and pressure at the point of metering.

The present invention provides an improved natural gas fuel metering assembly that overcomes the disadvantages of previous natural gas metering assemblies. The present invention provides for the temperature and pressure sensors to be mounted in the intake manifold and senses the natural gas temperature and pressure immediately prior to the natural gas flowing into the injectors.

The metering assembly of the present invention further provides improved mounting of the assembly by utilization of the existing, industry standard, diesel fuel injector pump mounting flange on the cast block. By mounting the natural gas fuel metering assembly to the existing diesel injector pump flange, the need for a separate cover for the diesel injector pump flange is eliminated and an esthetically pleasing mounting of the fuel metering assembly results.

DESCRIPTION OF THE PREFERRED EMBODIMENT

Figure 1:
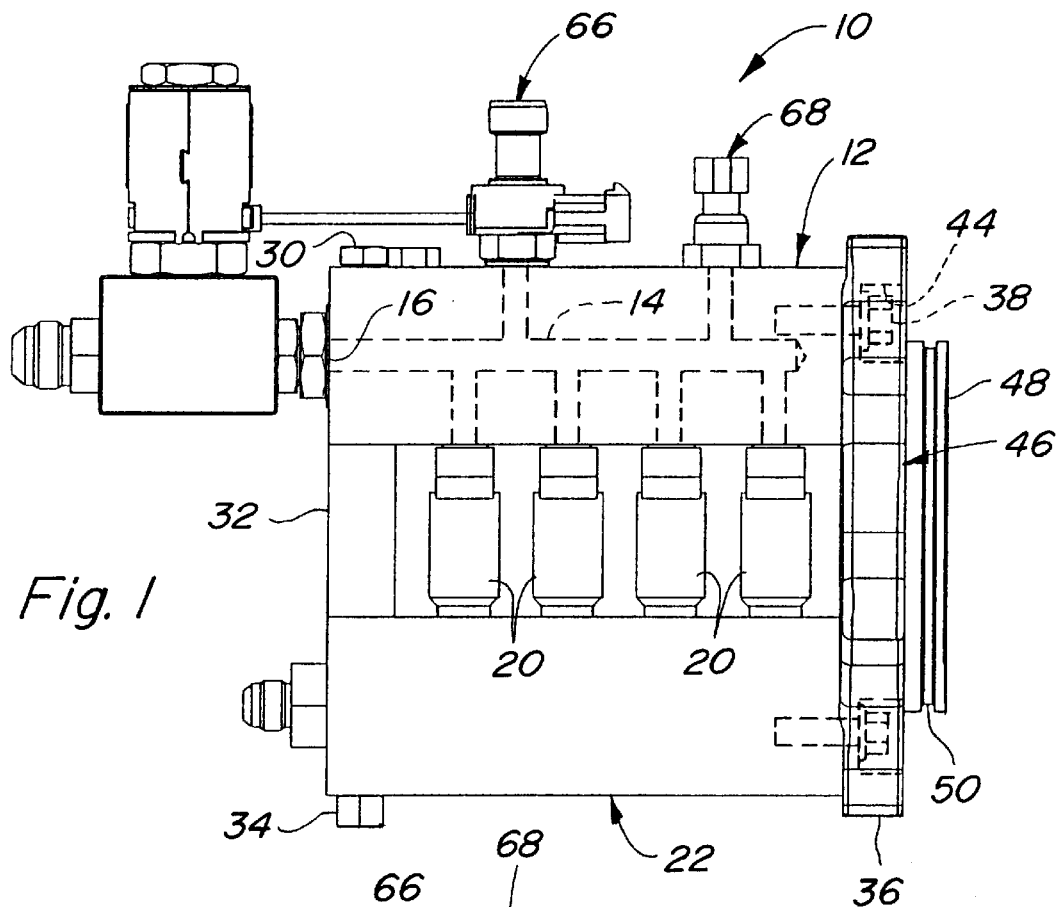
FIG. 1 is a side view of the natural gas metering assembly of the present invention.
Figure 2:
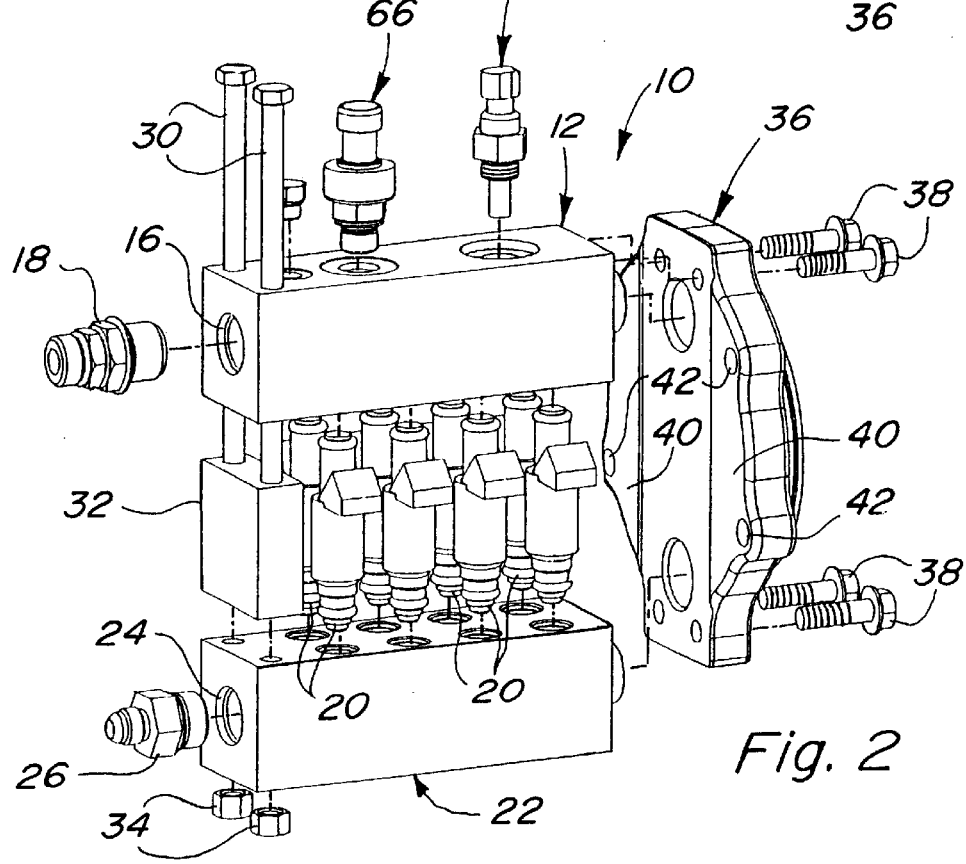
FIG. 2 is an exploded perspective view of the metering assembly shown in FIG. 1.

The fuel metering system of the present invention is shown in FIG. 1 and designated generally at 10. The assembly 10 includes an inlet manifold 12 with an internal passage 14 having a gas inlet 16 (FIG. 2). A fitting 18 is disposed in the inlet 16 to connect the assembly to a fuel supply line (not shown). A plurality of fuel injectors 20 are connected to the inlet manifold and communicate with the internal passage 14 to receive natural gas therefrom. The fuel injectors are electronically controlled and are opened or closed to vary the quantity of natural gas flowing through the assembly 10.

Figure 4:
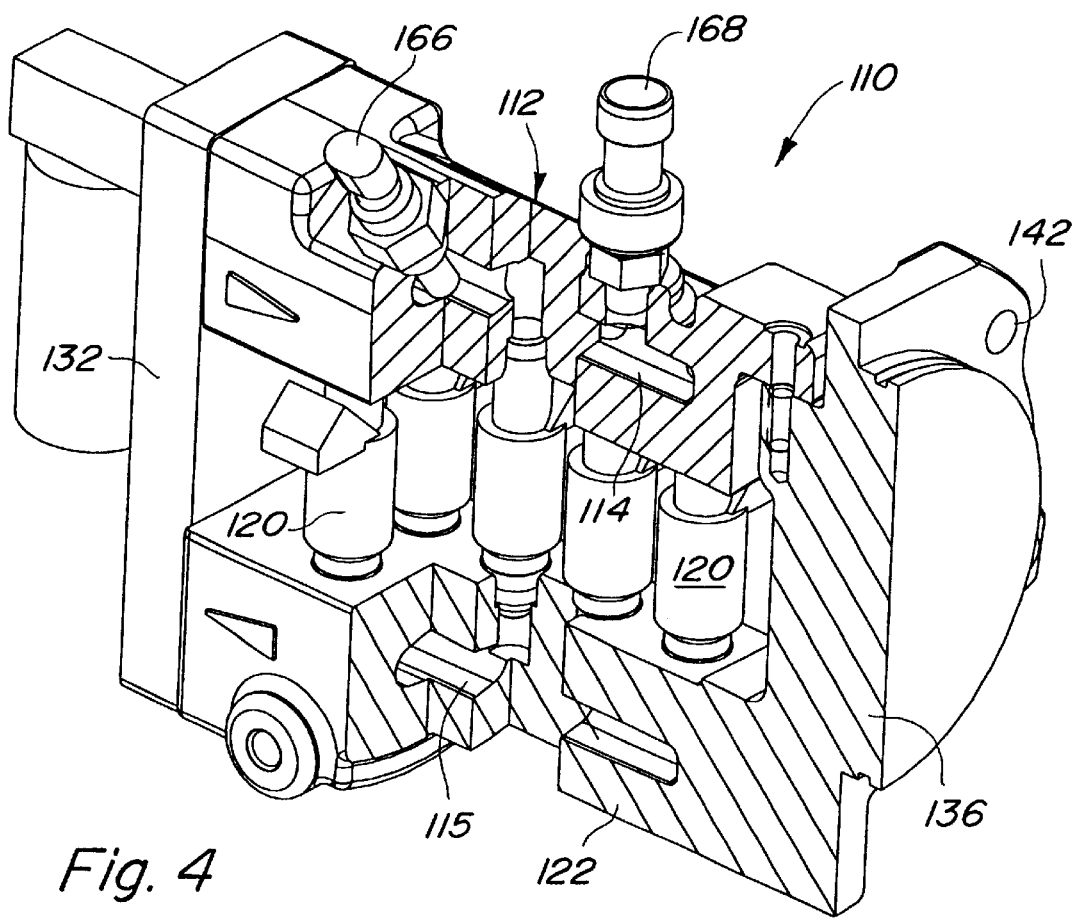
FIG. 4 is an alternative embodiment of the metering assembly of the present invention.

An outlet manifold 22 is provided on the opposite side of the injectors 20 from the inlet manifold 12 and has an internal passage 115, shown only in FIG. 4 with the alternative embodiment, like the passage 14 of the inlet manifold 12. The outlet manifold 22 receives the natural gas from the injectors 20 and discharges a natural gas through an outlet 24 shown in FIG. 2. An outlet fitting 26 connects the outlet manifold 22 to a fuel line (not shown) that directs the natural gas to the engine intake manifold.

A pair of bolts 30 extend through the inlet and outlet manifolds on one end and through a spacer 32 to fix the inlet and outlet manifolds in position relative to one another. Nuts 34 are fastened to the ends of the bolts 30. At the other end of the assembly, a spacer or member 36 is fastened to the ends of each of the inlet and outlet manifolds by bolts 38. The member 36 is in the form of a mounting plate having flange portions 40 with holes 42. The member 36 has recesses 44 that receive the heads of the bolts 38 so that the face 46 of the member 36 is substantially flat with a raised circular projection 48 in the center. The raised circular portion has a radially outward O-ring groove 50.

Figure 3:
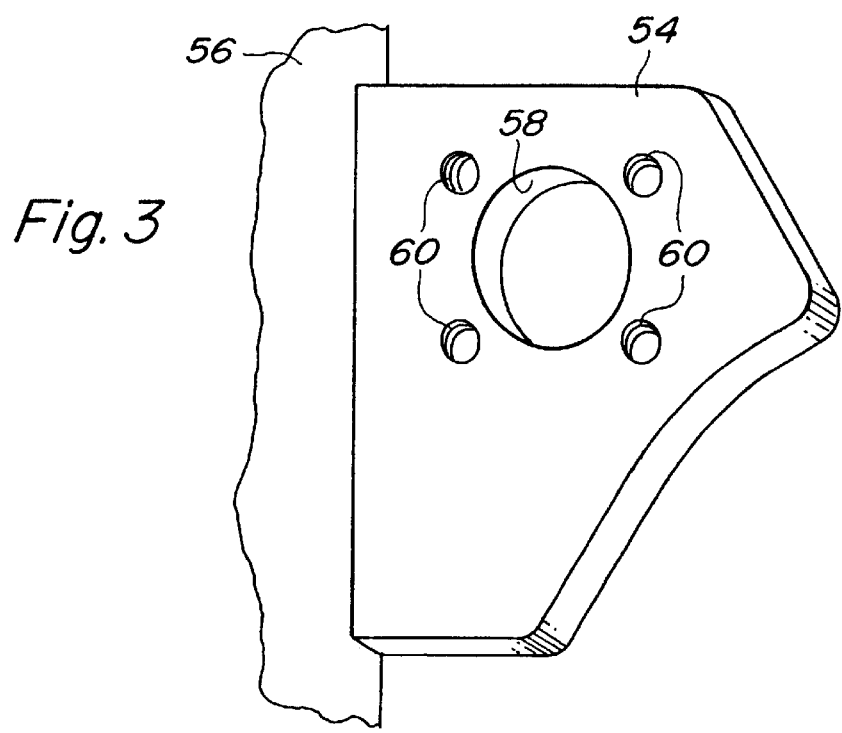
FIG. 3 is a perspective view of the diesel injector pump flange portion of the engine block.

The member 36 is sized to be mounted to an injector pump mounting flange 54 (FIG. 3) integrally cast with the engine block 56. When the engine block 56 is used for a natural gas engine, it is necessary to cover the opening 58 in the flange 54. Bolts 62 extend through the flange portions 40 of the member 36 and are threaded into the bolt holes 60 in the engine block flange 54. The O-ring groove 50 receives an O-ring (not shown) that seals within the opening 58 to prevent oil leakage through the hole 58.

Pressure sensor 66 and temperature sensor 68 are mounted to the inlet manifold 12 and communicate with the internal passage 14 to sense the fuel pressure and temperature in the manifold, just before the injectors 20. The signals from the sensors are directed to a fuel system controller that opens and closes the injectors 20. This regulates, or controls the amount of fuel entering the engine. This placement of the pressure and temperature sensors allows feedback of the fuel pressure and temperature, two critical factors effecting the quantity of energy delivered to the engine, at the point of metering of the fuel.

An alternative embodiment of the metering assembly of the present invention is shown in FIG. 4 and designated generally at 110. Components similar to components of the assembly 10 are given the same reference numeral with the addition of 100. The assembly 110 has an intake manifold 112 and an outlet manifold 122. The inlet and outlet manifolds 112, 122 have internal passages 114, 115 respectively.

A plurality of fuel injectors 120 extend therebetween in a similar fashion as with the assembly 10. Pressure sensor 166 and temperature sensor 168 are also mounted to the inlet manifold 112 to sense pressure and temperature of the natural gas within the inlet manifold. A spacer or member 132 is fastened to the ends of the inlet and outlet manifolds by fasteners not shown. In the embodiment 110, the outlet manifold 122 is integrally formed with the other spacer or member 136 as a single piece. In this embodiment, the manifolds are made of cast aluminum although other materials may be used.

While the embodiment 110 provides a fewer number of parts to assemble, the porosity of the cast aluminum may be an issue. In the assembly 10 shown in FIGS. 1 and 2, the manifolds are made of billet aluminum that is gun drilled to precisely form the holes of the internal passages. The billet aluminum has less porosity than the cast aluminum.

The invention provides a convenient and attractive fuel metering assembly for a natural gas engine converted from a diesel engine. By mounting the assembly to the diesel engine injector pump flange, a separate cover for the flange is not needed. The assembly also mounts the temperature and pressure sensors at the point of metering to provide real time feedback of these fuel parameters.

Having described the preferred embodiment, it will become apparent that various modifications can be made without departing from the scope of the invention as defined in the accompanying claims.

What is claimed is:

1. A gaseous fuel metering assembly for use with a gaseous fuel engine, the assembly comprising:
   an inlet manifold having a gaseous fuel inlet and a gas passage therein;
   a plurality of gaseous fuel injectors in fluid communication with the gas passage of the inlet manifold to receive gaseous fuel therefrom;
   an outlet manifold having a gas passage therein, the gas passage being in fluid communication with the plurality of gaseous fuel injectors to receive gaseous fuel therefrom, the outlet manifold further having a gaseous fuel outlet;
   a spacer coupled to the inlet and outlet manifolds to hold the manifolds in a fixed position relative to one another with the fuel injectors therebetween, the spacer having a flange portion with holes therein adapted to align with holes in a diesel fuel injector pump flange of a diesel engine as part of a gaseous fuel conversion of a diesel engine.

2. The engine as defined by claim 1 further comprising a gaseous fuel pressure sensor mounted to the inlet manifold and in fluid communication with the gas passage therein.

3. The engine as defined by claim 1 further comprising a gaseous fuel temperature sensor mounted to the inlet manifold and in fluid communication with the gas passage therein.

4. The engine as defined by claim 1 wherein the spacer is integrally formed with one of the inlet and outlet manifolds as a single component.

5. A gaseous fuel engine comprising:
   a diesel engine block having a diesel fuel injector pump flange with a plurality of bolt holes to mount a diesel fuel injector pump thereto;
   a gaseous fuel metering assembly comprising:
     an inlet manifold having a gaseous fuel inlet and a gas passage therein;
     a plurality of gaseous fuel injectors in fluid communication with the gas passage of the inlet manifold;
     an outlet manifold having a gas passage therein and in fluid communication with the plurality of gaseous fuel injectors, the outlet manifold further having a gaseous fuel outlet;
     first and second members coupled to the inlet and outlet manifolds to hold the manifolds in a fixed position relative to one another with the fuel injectors therebetween, the first member having a flange portion with holes therein aligned with the holes in the diesel fuel injector pump flange and mounted thereto.

6. The engine as defined by claim 5 further comprising a gaseous fuel pressure sensor mounted to the inlet manifold and in fluid communication with the gas passage therein.

7. The engine as defined by claim 5 further comprising a gaseous fuel temperature sensor mounted to the inlet manifold and in fluid communication with the gas passage therein.

8. The engine as defined by claim 5 wherein the first member abuts an end of each of the inlet and outlet manifolds and further comprising bolts extending through the first member and into the inlet and outlet manifolds, the bolts being recessed into the first member and facing the diesel fuel injector pump flange.

9. The engine as defined by claim 5 wherein the first member is integrally formed with one of the inlet and outlet manifolds as a single component.

* * * * *